Jan. 24, 1961
D. KAHN ET AL
2,969,030
PRODUCTION OF WRITING TIPS
Filed Oct. 22, 1958
5 Sheets-Sheet 1
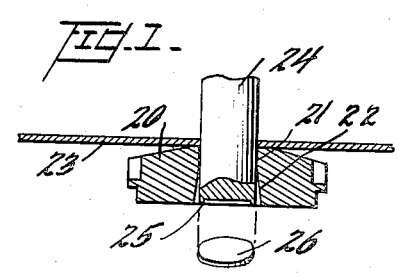
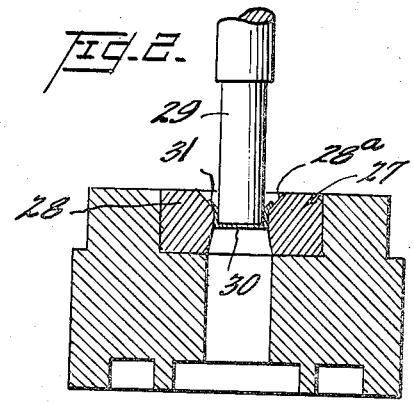
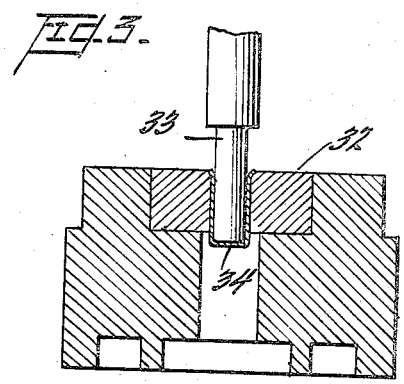
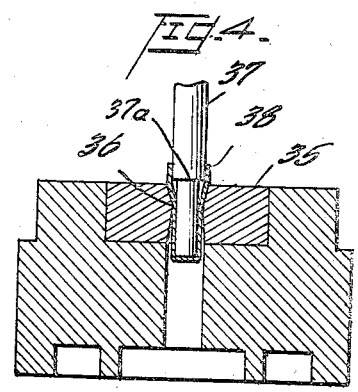
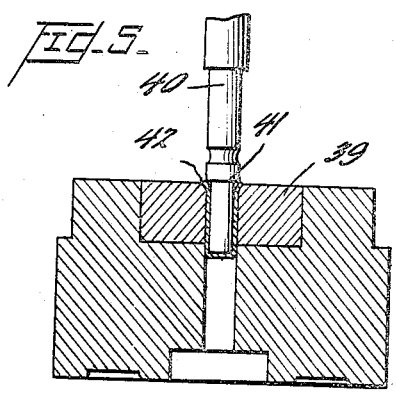
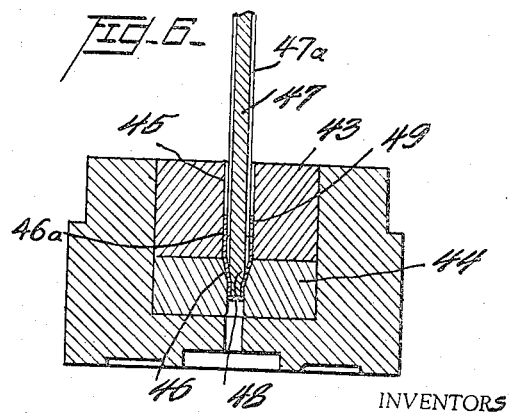
INVENTORS
BY
ATTORNEY

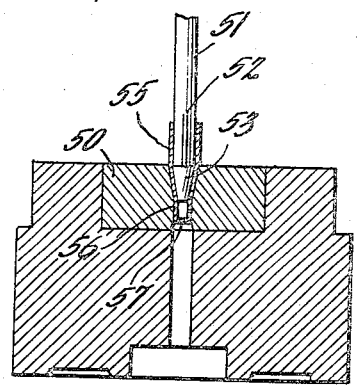
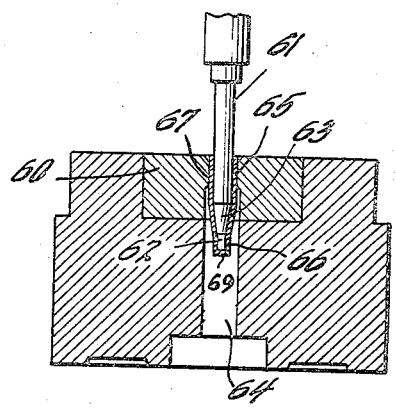
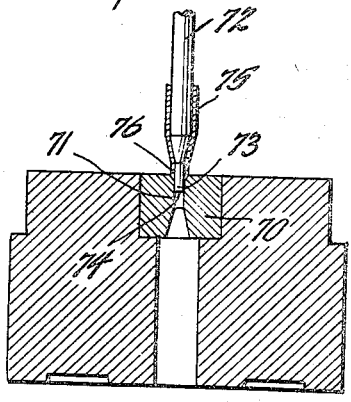
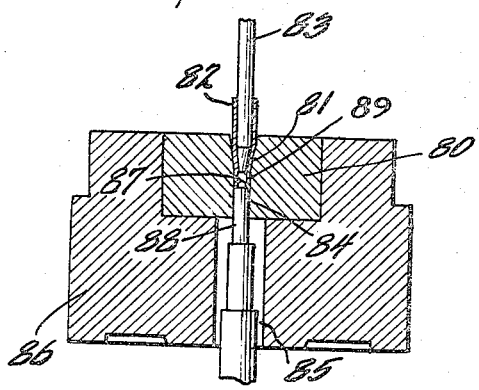

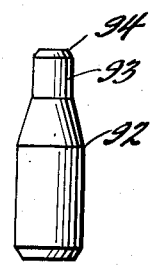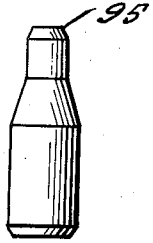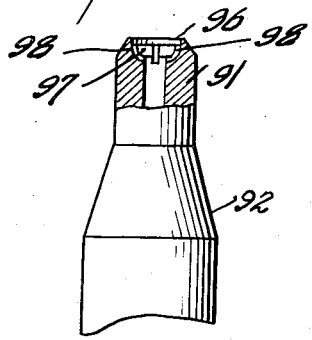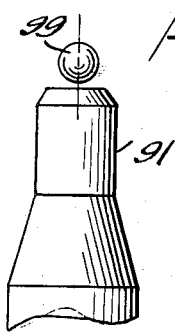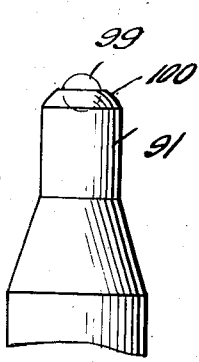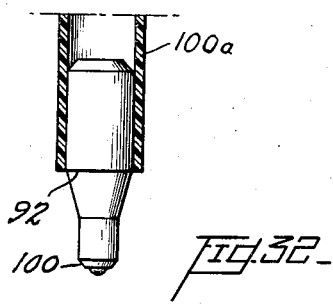

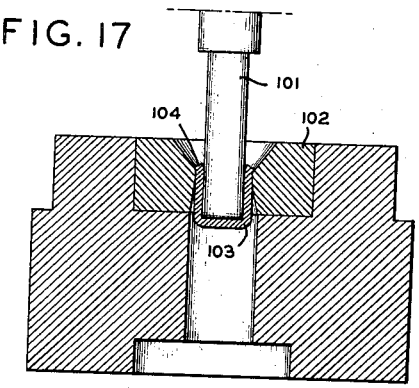
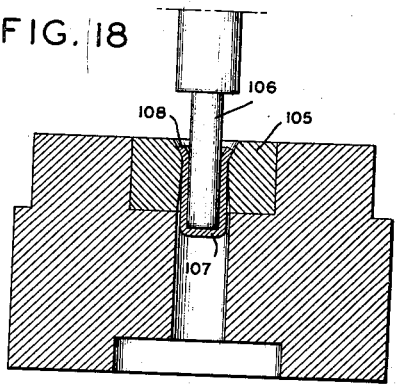
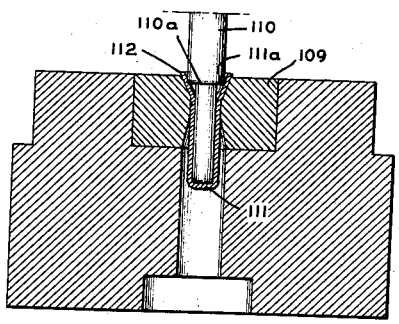
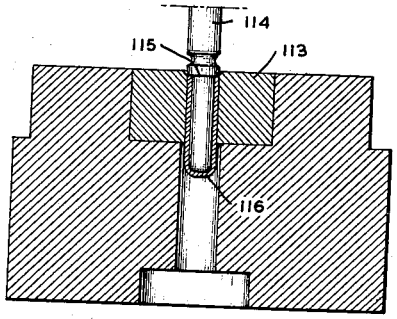
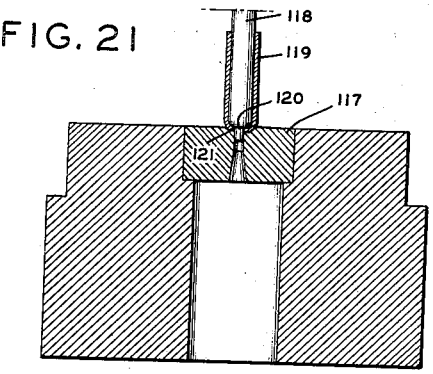
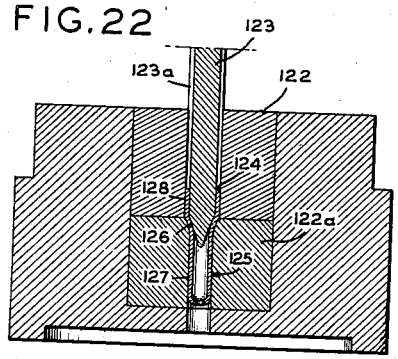

Jan. 24, 1961
D. KAHN ET AL
2,969,030
PRODUCTION OF WRITING TIPS
Filed Oct. 22, 1958
5 Sheets-Sheet 5
FIG.23
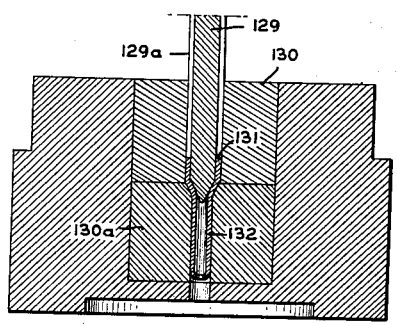
FIG.24
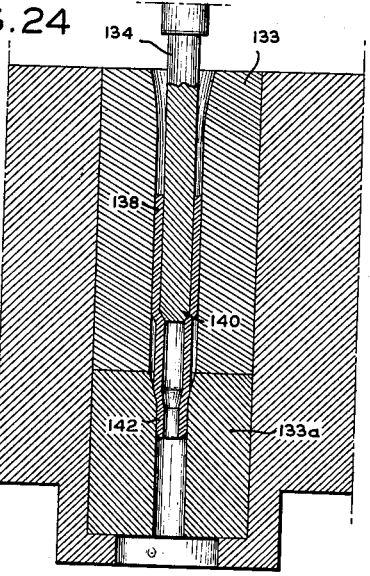
FIG.25
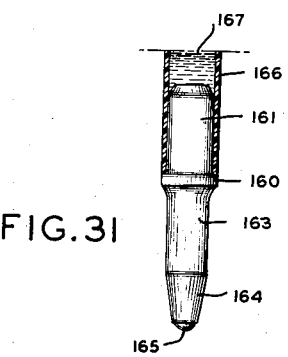
FIG.26　FIG.27　FIG.27
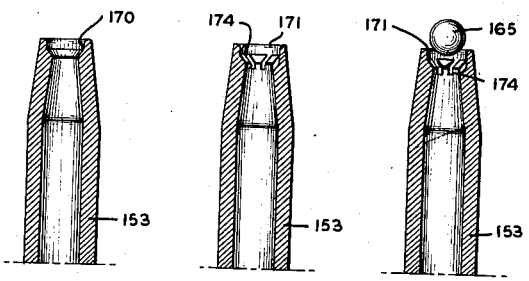
FIG.29　FIG.30
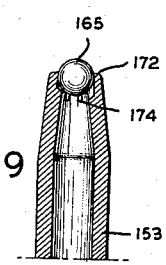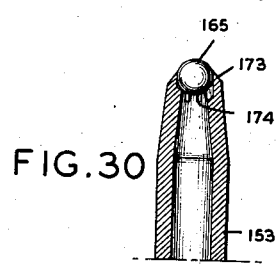
FIG.31
INVENTOR
BY
ATTORNEY

United States Patent Office 2,969,030
Patented Jan. 24, 1961

2,969,030

PRODUCTION OF WRITING TIPS

David Kahn, deceased, late of Englewood Cliffs, N.J., by Julius M. Kahn, Samuel Kahn, and Harry Yager, all of Englewood Cliffs, N.J., all executors, and Karl Weisser, deceased, late of Cresskill, N.J., by Helen E. Weisser, Cresskill, N.J., executrix, assignors to David Kahn, Inc., North Bergen, N.J., a corporation of New Jersey Filed Oct. 22, 1958, Ser. No. 768,864

11 Claims. (Cl. 113—32)

This invention relates to a ball point writing tip for ball point pens. More particularly, this invention is directed to the production of a writing tip from sheet metal stock by a series of drawing operations to produce a hollow elongated writing tip blank, then providing in said blank a seat for the writing ball, and inserting and securing the ball in said seat.

As conducive to a clear understanding of this invention, it may be here pointed out that it is presently conventional to provide tips for ball point pens from solid rod stock which is drilled and machined to the desired configuration to produce the hollow elongated blank. The ball seat is subsequently formed in said blank and the ball inserted and secured therein. This conventional method of manufacturing is a comparatively costly operation which consequently increases the cost of the pen to the consumer to a material extent.

By means of the present invention, the blank may be drawn from a disk cut from sheet metal stock material without the necessity of any machining or drilling whatsoever. Such a tip may be produced at a fraction of the cost as compared to the conventional method. The result in savings when passed on to the consumer materially decreases the cost of each individual pen.

Furthermore, the method according to the present invention produces a writing tip which is significantly better and more durable than that of the prior art. These unexpected and surprising properties of a tip produced according to the present invention will be further discussed hereinafter.

It is an object of the present invention to produce a writing tip which is made from a blank made by a series of drawing operations on flat metal stock.

It is a further object of the present invention to produce a writing tip for ball point pens wherein the walls of the tip comprise drawn metal.

An additional object of the present invention is the production of a tip which may be produced on a standard drawing machine provided with dies as hereinafter disclosed with a comparative minimum of time, effort and difficulty.

Other objects reside in the method of producing a drawn writing tip, in the writing tip blank, and in the finished tip per se.

These and other objects will be readily apparent from the following description.

The accompanying drawings diagrammatically illustrate the dies and the method of the present invention.

In the drawings:

Fig. 1 is a transverse sectional view somewhat diagrammatic showing the first step of the present invention wherein a blank strip of material is processed to produce a disk member from which the tip is manufactured, there being shown only the die, the plunger member, the strip of material and the finally produced disk.

Figs. 2 to 10, inclusive, are similar transverse sectional views setting forth the steps of the method for producing the tip blank, said transverse sectional views also setting forth the dies, plungers and the intermediate product at each step of the method.

Figs. 11, 12 and 13 are side elevational views of the tip during the shaping operation thereof preparatory to forming the ball seat.

Fig. 14 is an enlarged side elevational view partially broken away and partially in section of the writing instrument tip after hobbing and the forming of the peripheral grooves therein to provide a seat for the ball member.

Fig. 15 is an elevational view showing the ball about to be seated in the tip of the writing instrument.

Fig. 16 is an elevational view showing the tip member with its writing ball member secured therein.

Figs. 17–25 inclusive are transverse sectional views analogous to Figs. 2–10 setting forth the steps of the method for producing a modified form of the tip.

Figs. 26 to 30 are transverse sectional views showing the steps of forming the ball seat at the tip of the blank, inserting the ball in said seat and securing the ball therein.

Fig. 31 is an elevational view partly in section showing the tip produced by the method of Figs. 17–30 with the writing ball mounted therein, the tip being mounted in a plastic cartridge.

Fig. 32 is an elevational view partly in section showing the tip produced by the method of Figs. 1–16 with the writing ball mounted therein, the tip being mounted in a cartridge.

Similar reference characters refer to similar parts throughout the several figures of the drawings.

In the following description, the step by step method therein disclosed may be carried out utilizing any standard drawing press, the latter being equipped with dies and punches conceived and formulated in accordance with the following disclosure.

Having reference to the drawings in detail, and more particularly to Fig. 1, there is generally indicated at 20 a die having a substantially circular bore 21 therein, which is outwardly flared as at 22. A flat sheet of material 23, such as copper, brass, gold, silver or any other equivalent metal or alloy, is positioned over die 20 and when impacted by a plunger 24 having a cutting edge 25 thereon, a disk 26 of suitable diameter is struck from the sheet of metal. This operation is repeated periodically and the number of dies 20 and plungers 24 may be multiplied in such manner as to strike the maximum number of disks 26 from each sheet 23.

The disks are conveyed in any suitable manner to a second die 27 (Fig. 2) which includes a tool steel center portion 28 having a tapered peripheral rim 28a wherein the disks are impacted by a plunger 29 to shape the disks into cup shaped members 30 having outwardly flared annuli 31.

The cup shaped members 30 are then extracted from die 27 and conveyed by a carrier to still another die 32 (Fig. 3) where, upon the impact of plunger 33, the cup shaped members 30 are reduced in diameter and elongated to the shape shown at 34.

Upon extraction from the die 32 the cup shaped members 34 are conveyed to still another die 35 (Fig. 4) and further reduced in diameter and elongated to the shape shown at 36 by means of plunger 37 the forward portion of which is of reduced diameter to produce shoulder 37a. In this operation the flared portion is increased as shown at 38.

In the preferred form shoulder 37a partially cuts through the interior of the periphery of the cup 36 to produce a groove where shoulder 37a contacts the inner surface of the cup. The purpose of this partial cutting operation is to facilitate the next operation wherein the flared excess portion is completely severed from the cup shaped member. By partially cutting through the wall of the cup 36, there is a considerable reduction in the wear and tear on the main cutting tool which is used in the next operation.

In the next operation the cup 36 is positioned in a die 39 and impacted by plunger 40 provided with a shearing or cutting surface 41 which serves to remove the flared portion 38. This cutting action may produce a slightly outwardly flared lip 42 diagrammatically exaggerated in Fig. 5. In the event shoulder 37a produced a groove as described in connection with Fig. 4, the cutting surface 41 severs the cup at this groove.

The next operation carries the tip to a relatively deep die 43 as shown in Fig. 6 which is provided at its lower portion with the second die member 44, the die 43 being provided with a substantially cylindrical bore 45 while the lower die 44 is provided with an upwardly tapered bore 46.

Upon the impact of plunger member 47 which is provided with a lowered tapered tip 48 and a shoulder 49, adapted to force the tip 46a downwardly a substantial distance into the bore 45, the tip is tapered by compression into the bore 46 to assume the form shown in Fig. 6. The plunger 47 has grooves 47a which act as guides for a stripper which rides in these grooves and strips the tip from the plunger 47. In this operation the lip 42, if such a lip is formed in Fig. 5, will be straightened out and the upper edge of the cup will be squared off.

In the cutting step the cup is cut to predetermined dimensions, the significance of which will be pointed out hereinafter.

In the following operation, as shown in Fig. 7, a die 50 receives a plunger 51 provided with groove 52 and a tapered portion 53. In this operation there is produced a cup 55 having a tapered end terminating in a substantially cylindrical portion 56 with a flattened end 57. The groove 52 acts as an air vent to enable the release of the cup or partially formed tip blank from the plunger 51.

In the next step of the operation there is shown in Fig. 8 a die 60 which receives plunger 61, the latter having a tapered portion 63 which terminates in a cylindrical tip 62. The plunger 61 serves to force the tip downwardly into a bore 64 to produce the cup or tip 67 having an elongated narrow cylindrical end 66 closed by end wall 69.

In the next step of the operation (Fig. 9) there is provided a die 70 having a relatively small bore 71 of less diameter than the flattened end wall 69 of the shell 66. A plunger 72 having an elongated small diameter tip 73 provided with a cutting end 74 penetrates the shell 75 to remove end wall 69 to provide an aperture 76 in the end of the shell 75. The ball seat is eventually formed in aperture 76.

In the next step of the operation (Fig. 10) the tapered end 81 of the shell is placed in a die 80 and the shell is simultaneously impacted by plunger 83 from the upper side and by plunger 84 from the lower side to produce the hollow elongated writing tip blank 82. The upper plunger 83 is tapered as shown in the drawing and the lower plunger 84, which is inserted through the lower open end 85 of die block 86, is provided at its tip with a narrow cylindrical portion 88 terminating in a hemispherical member 87 of lesser diameter. The outside diameter of the portion 88 of plunger 84 is substantially equal to the outside diameter of the end 89 of the writing tip shell and this serves to remove and smooth out any burrs occasioned by the perforating operation disclosed in Fig. 9. Plungers 83 and 84 are simultaneously operated by a suitable cam mechanism.

The above sequence of operations completes the portion of the method which results in the production of the writing tip blank. These blanks are transferred to a dial machine equipped with dies, plungers and other elements necesary to form the ball seat at the end 89 of the blank.

In this machine, the first station is shown in Fig. 11 which comprises a setting tapering die and punch. The blank is placed in a bushing to hold it in position for the subsequent operations. Setting the blank in the bushing makes a taper 90 at the bottom of the tip which renders it easier to insert the tip in the tubing which comprises the body of the cartridge.

In the next station (Fig. 12) a further die and punch assembly forms a slight inclined taper of, for example, 30 degrees from vertical as indicated at 94 on the cylindrical end 93 of the tip 92. In the next station (Fig. 13) an additional die and plunger assembly further extends the taper of the tip as shown at 95.

The tip is now ready for the hobbing operation at the next station (Fig. 14). The aperture shown at 76 (Fig. 9) is smaller than the diameter of the writing instrument ball. In order to properly size the aperture, the hobbing member forces the metal of the walls of the aperture downwardly to increase the size of the recess and simultaneously smooth the walls of the seat. The hobbing member has the same shape as the finally produced seat.

More specifically, the hobbing operation comprises the formation of a hemispherical recess 97 in the extremity 91 of the tip 92 and also the formation of a plurality of longitudinally extending channels 98 and a peripheral groove 96. The channels and the groove serve to permit the passage of ink past the ball. The peripheral groove 96 at the extremity 91 of the tip 92 has a diameter equal to the major diameter of the channels 98.

At station 5 (Fig. 15), the ball 99 is dropped into the hemispherical recess 97.

At station 6 (Fig. 16), the tip is finished by suitable swaging, spinning or otherwise reducing the diameter of the rim 100 of the tip beyond the center of the circumference of the ball to hold the ball therein. The completed tip is now inserted into the tube 100a which forms the ink reservoir of the cartridge as shown in Fig. 32.

The cartridge assembly is used in a conventional ball point writing instrument.

Figs. 17–31 show the method of producing another modification of the present invention. A disk is made in the manner shown in Fig. 1. This disk is then placed in the die 102 of Fig. 17 wherein plunger 101 in cooperation with the die 102 forms the disk into a cup shaped member 103 having an outwardly flared annulus 104. Cup shaped member 103 is then placed in the die 105 of Fig. 18 where it is elongated by means of plunger 106 to form cup shaped member 107 which is elongated and of reduced diameter as compared to cup shaped member 103. The flared portion 108 is also enlarged.

The device 107 is then placed in the die 109 of Fig. 19 which by means of plunger 110 further elongates the cup to produce a cup shaped member 111 having the flared portion 112. Plunger 110 has a shoulder 110a which preferably partially severs the interior of the wall of the cup to produce a groove 111a.

The purpose of this partial cutting operation is to facilitate the next operation wherein the flared excess portion is completely severed from the cup shaped member. This partial cutting through the wall of the cup results in a considerable reduction in the wear and tear on the main cutting tool which is used in the next operation.

In the next station, shown in Fig. 20, die 113 cooperates with plunger 114 to remove the flared portion 112 to produce cup shaped member 116 of predetermined dimensions having straight walls. The plunger 114 has a cutting or shearing surface 115 which cuts the cup shaped member at the groove 111a if such groove was previously formed therein.

It is evident that the flared portion produced in the previous operations is constituted by excess material whose size may vary from cup to cup. This excess flared material must be removed in order to produce a uniform writing tip blank.

In accordance with the present invention, this flared portion is removed during the cutting operation to produce a cup having substantially straight walls, the cup being of predetermined reproducible dimensions. This dimensioning is not only necessary to determine the length of the finished blank but also produces uniformly sized cups to be used in all successive operations.

If the cups were not uniform, not only would the finished product be non-uniform but the successive tools used in the manufacturing operation would be damaged or broken. Thus, the cutting operation is an important element in obtaining and maintaining the necessary correct tolerance to produce articles of substantially identical shape on automatic machinery.

Under proper conditions, when the cutting edge such as shown in Fig. 20 is new and sharp, there is produced a clean cut resulting in a cup having substantially straight walls with the upper edge thereof being squared off. It is evident that as the cutting edge begins to wear, the edge of the cup may not be perfectly square and may have burrs left thereon. Excess wear on the cutter may also produce a slight lip. In the event these imperfections remain at the edge of the cup, they will be removed as will be described in connection with Fig. 22. In addition, in Fig. 20 the plunger rounds off the bottom of cup 116.

The cup which is now generally cylindrical having a closed round bottom is transferred to die 117 in Fig. 21 wherein it is acted upon by plunger 118 having a punch 120 at the end thereof to produce a generally cylindrical member 119 having a perforation 121 at the bottom thereof.

In the modification disclosed in Figs. 1–10, the tip was drawn to the shape shown in Fig. 8. When the bottom wall of the tip in the first modification is punched (as shown in Fig. 9), the diameter of the punching end 73 of the plunger is virtually the same as the internal diameter of the cylindrical end 66 of the shell. Therefore, during the punching operation of Fig. 9, the punch may repeatedly engage the inner wall of the end 66 which weakens the punch and dulls the cutting edge of the plunger resulting in a relatively short life of the punch. Furthermore, it was difficult to maintain the concentricity of the inner and outer walls of the end 66 of the cup.

These difficulties are avoided in the modification shown in Fig. 21 since the perforation 121 is made before the forward end of the tip is reduced in diameter. This provides sufficient clearance between the inner wall of the cup and the punch 120. In this modification, the concentricity of the inner and outer walls is maintained.

In the next step (Fig. 22) a plunger having a shoulder 124 cooperates with dies 122 and 122a to form the shell 125 having a rear cylindrical portion 128, an intermediate tapered portion 126 and a forward cylindrical portion 127 of lesser diameter than the rear cylindrical portion 128.

Plunger 123 is provided with grooves 123a which function in the same manner as grooves 47a in Fig. 6 to provide guides for the stripper which rides in these grooves and strips the tip from the plunger. The shoulder 124 of plunger 123 performs a dual function. First it serves to drive the tip into the die to elongate the lower end of the tip. Secondly in the event the edge of the cup was not cleanly cut in the cutting step shown in Fig. 20, the shoulder 124 will square off this edge and remove any burrs thereon.

In the next step (Fig. 23) plunger 129 cooperates with dies 130 and 130a to produce shell 132. In this step the shell is further elongated and the diameter of the forward portion is reduced. Plunger 129 has grooves 129a and shoulder 131 which function in the same manner as the grooves 123a and shoulder 124.

In the step of Fig. 24 there are provided cooperating dies 133 and 133a and the plunger 134 having a tapered end 140. As the shell is forced into the die, there is produced a shell 138 having the forward extremity 142 thereof of reduced diameter.

In the next step (Fig. 25) there are provided cooperating dies 143, 151, 144 and 152 together with plungers 147 and 145. The shell is acted on between these dies and plungers as shown in Fig. 25 to produce a bulge or shoulder 150 between the intermediate ends of the shell. The lower plunger 147 has a bevel 148 at the upper end thereof. This beveled end inwardly bevels the end 149 of the shell 153 to prepare the end 149 for subsequent operations. The die 151 cooperates to produce the taper of the end 149 as shown in the drawing. The lower end 146 of plunger 145 is tapered. Taper 146 cooperates with die 144 to shape the upper end of the shell 153 as shown in the drawing to facilitate the insertion of the finished tip into the cartridge tube. The plunger 145 also serves to eject the shell 153 from the dies at the completion of this operation.

The shell 153 produced by the step illustrated in Fig. 25 is the completed hollow writing tip blank which is now ready for another series of operations to form the ball seat at the end 149 thereof.

The ball seat in blank 153 may be produced in the manner shown in Figs. 11–14. However, it is preferable to partially form the seat as shown in Fig. 26 by drilling to enlarge the extremity of the internal bore of the blank as shown at 170.

In the next step (Fig. 27) the seat is completed by a broaching or hobbing operation which displaces the metal of the tip rearwardly to produce a hemispherical recess or ball seat 171 having channels and grooves 174 in the same manner as shown in Fig. 14. In this operation a tool provided at its end with a shape which is complementary to the ball seat 171, is moved parallel to the axis of the blank to cause the flow of metal rearwardly which results in the production of a smooth ball seat without removal of any metal from the blank.

In the next step (Fig. 28) ball 165 is inserted into the seat and in the next step (Fig. 29) the extremity 172 of the tip is slightly beveled to loosely hold the ball in position, while in the step shown in Fig. 30, the edge 173 is completely beveled or forced around the ball by swaging or spinning or any suitable manner to keep the ball in position.

The completed tip is mounted in a tubular cartridge as shown in Fig. 31. The rear cylindrical portion 161 is force-fitted into the end of the cartridge tube 166 until the edge of the cartridge tube is seated against the shoulder 160 of the writing tip.

It is evident that the writing tip comprises a rear generally cylindrical portion, an intermediate bulged portion 160, a forward generally cylindrical portion 163 terminating in a tapered portion 164 having the ball 165 seated at the end thereof. The cartridge 166 is preferably made of plastic such as polyethylene although it may be made of metal or any other material.

Ink 167 is placed in the cartridge 166 and, while writing with the pen, the ink flows from the cartridge through the internal bore of the writing tip through the channels and grooves at the end thereof and around the ball.

From the foregoing, it is evident that the writing tip blank has been produced from flat metal stock only by a series of drawing operations thus eliminating the need for starting with cylindrical rod stock which must be drilled and machined to shape.

By producing a writing tip blank from flat metal stock, the amount of waste metal can be kept to a minimum. Since in the final blank, as is evident from the drawings, the walls are of substantially uniform thickness, a minimum of metal is used. The interior shape would be almost impossible to produce by conventional drilling and machining techniques and would only result in additional waste of metal.

One of the purposes of the present invention is to enable the production of a writing tip blank in a standard drawing machine wherein all the tools used are reciprocating tools. This creates a problem since the excess material (the flared annular portion) is formed during the initial drawing of the hollow shell or cup from the flat stock. This excess material must be removed and at the same time provision must be made for maintaining accurate sizing of the shell for the subsequent processing steps.

In accordance with the present invention, the excess material is removed by means of a reciprocating cutter, the cutter moving parallel to the axis of the shell. In this operation the excess portion is removed to produce a shell of predetermined size. As has been pointed out previously, this step is particularly significant in order to maintain the tolerance necessary in the mass production of a writing tip of the character described.

Another advantage of the present invention is that the final writing tip has strength and wear qualities superior to that produced by machining a tip from rod stock.

In the machined prior art tip, when the internal bore is drilled, circular tool marks are produced along the interior of the bore. These circular tool marks tend to restrict the flow of ink toward the ball. On the contrary, in a drawn tip produced as herein described, the metallic material constituting the tip flows into shape during the drawing operation and there are no interior tool marks to retard the flow of ink.

Further the metal, during the drawing operation, is constantly work-hardened. This produces a writing tip wherein the body of the tip is harder than that obtained by a machined tip. This also gives the ball seat a harder bearing surface, when drilled or hobbed, to withstand the punishment and wear of the rotating ball much longer than a machined tip. Furthermore, this harder ball seat because of the reduction in wear, produces a freer rolling ball in addition to the bearing surface lasting much longer than that produced in the prior art machining methods.

It is evident that the wall of the tip surrounding the ball is very thin and any increased hardening of this wall will serve to materially extend the life of the writing tip.

One of the problems arising in producing a tip by machining rod stock is the removal of the excess material after drilling the internal bore. In the event all of this excess material is not eliminated, the ink feed will become obstructed and/or the chips of metal may retard rotation of the ball.

These problems are eliminated in producing the blank by a drawing operation and this greatly reduces the number of rejected articles. Thus, it is evident that the present method is a far more efficient method of producing a writing tip than the prior art and also results in a writing tip having more desirable wear properties than that of the prior art.

Furthermore, as disclosed in Figs. 11–16, the seat is produced without any drilling whatsoever. In the second modification, there is only a single drilling step necessary such as shown in Fig. 26. Both of these methods result in the formation of a ball seat which is substantially perfectly smooth. In the prior art practice, it was necessary that the seat wall or bearing surfaces be polished or plated with a soft metal to produce a smooth seat. This is eliminated in accordance with the present invention.

It is evident that in both illustrated embodiments there is produced a writing tip having an elongated tubular body with a substantially cylindrical rear portion and a substantially cylindrical forward portion of reduced diameter. In the second and preferred modification, the cylindrical forward portion has a slight taper. In both modifications, the intermediate portion is tapered. However, in the second modification, said intermediate portion includes an outwardly extending annular shoulder of greater diameter than the rear portion, said shoulder providing a seat for the tubular cartridge in which the tip is subsequently inserted and secured.

Thus, according to the present invention, there is provided a method wherein an elongated tubular blank is formed by a series of drawing operations and the seat for the writing ball is formed at one end of the blank. The blank is made by drawing flat metal stock into an elongated hollow shell having an open rear end, a closed forgated forward end and an outwardly flared annular portion of excess material at the open end. This excess material is severed from the shell by means of a cutter moving parallel to the axis of the shell leaving behind a shell of predetermined dimensions. Either during the severing operation or subsequent thereto, the edge of the shell is squared off.

The shell is subsequently further drawn to reduce the diameter of the forward portion thereof and a seat for a ball is formed at the extremity of the forward portion. In order to provide communication between the bottom of the seat and the interior of the shell, an aperture is formed at an intermediate step, preferably after the excess portion has been removed, and also preferably before the diameter of the forward portion is reduced. Furthermore, the severing is preferably done in two stages, the interior of the wall of the cup being partially severed in the first stage with the severing being completed in the stage.

It is apparent that in both illustrated embodiments the most drastic change in shape takes place when drawing the disk into the elongated cup as shown in Figs. 1–4 and 17–19. In such a drawing operation, the flared annular portion is formed which maintains the stock in position in the die while the plunger forms the cup. Because of this drastic change in shape, the dimensions of the flared annular portion vary from cup to cup and are not reproducible. Furthermore, the edge of the open end of the cup usually becomes rough and jagged and may even have several slight breaks because of the strain placed on the metal during the drawing.

The present invention is concerned with the production of a very small article by means of a metal drawing process. For example, the shell produced in the first modification may have an overall length of slightly more than six-tenths of an inch with the external diameter of the rear cylindrical portion being about one-tenth of an inch and with the exterior diameter of the forward cylindrical portion being about five-hundredths of an inch. The thickness of the wall of the shell is about two-hundredths of an inch and the diameter of the seat is less than four-hundredths of an inch. The dimensions of the second modification are of the same order. When dealing with an object of such small dimensions which is handled in the various processing assembly steps by automatic equipment, the variations in the dimensions of the annular flared portion and the roughened edge portion are sufficiently large to create a deleterious effect. It is for this reason that the annular flared portion is removed by the severing step in order to produce a shell of predetermined reproducible dimensions. In addition, during the severing operation as illustrated in Fig. 20 and during the squaring or smoothing-off operation (if necessary) in Fig. 22, the edge of the open end of the cup is substantially finished. In other words, the subsequent operations do not severely modify this edge.

If the annular flared portion produced prior to the cutting operation were not removed, merely straightening this annular portion would not readily result in the production of hollow shells of constant predetermined uniform dimensions.

As various embodiments may be made of this inventive concept, and certain modifications may be made in the specific steps or shapes described above, without departing from the spirit and concept of the present invention, it is to be understood that all matter herein is to be interpreted merely as illustrative and not in a limiting sense.

This application is a continuation-in-part of application Serial No. 430,799, filed May 19, 1954.

What is claimed is:

1. A method of forming a ball point writing tip which comprises drawing flat metal stock into an elongated cup wherein the edge of the rear open end of the cup is roughened, the roughness being sufficiently great as compared to the size of the final article to have a deleterious effect thereon, simultaneously forming an outwardly flared annular excess portion at the rear open end, severing said flared portion from said cup to provide a substantially finished edge at said open end, drawing said cup to reduce the diameter of the forward end thereof, forming a smooth surfaced seat at the forward extremity of the forward end, rotatably seating a writing ball in said seat, and forming an aperture providing communication between the interior of said forward portion and said seat at a stage prior to seating the ball in said seat.

2. A method of forming a ball point writing tip as recited in claim 1 wherein said flared portion is severed from said cup with a cutter moving parallel to the axis of said cup.

3. A method of forming a ball point writing tip which comprises drawing flat metal stock into an elongated cup wherein the edge of the rear open end of the cup is roughened, the roughness being sufficiently great as compared to the size of the final article to have a deleterious effect thereon, simultaneously forming an outwardly flared annular excess portion at the rear open end, severing said outwardly flared portion from said cup and reshaping the rim of the open end of said cup to a surface normal to the body of said cup to provide a substantially finished edge at said open end, further drawing said severed cup to reduce the diameter of the forward portion thereof, forming at the forward extremity of said forward portion a smooth surface hemispherical recess defining a seat for a writing ball, rotatably seating a ball within said seat, and forming a perforation providing communication between the interior of said forward portion and said seat prior to seating the ball within the seat.

4. The method of producing a ball point writing tip having a writing ball rotatably seated at the forward end thereof comprising drawing flat metal stock into a hollow elongated writing tip shell having a rear portion and a forward portion for flowing writing fluid from a supply through said rear portion into said forward portion, said shell having an open rear end and a closed forward end, forming an opening through said closed forward end for flowing said writing fluid from said forward portion to said ball to produce a shell having a longitudinal opening throughout its length, subsequently drawing the forward portion of the shell to reduce its diameter to a size less than the diameter of the rear portion, forming a hemispherical recess in the forward extremity of said shell, said recess defining a seat for rotatably seating said writing ball, and rotatably seating said writing ball in said recess.

5. The method of producing a ball point writing tip as recited in claim 1 wherein at least one longitudinal channel is formed in the wall defining said recess for flowing writing fluid around a portion of the surface of the ball.

6. The method of producing a ball point writing tip as recited in claim 5 wherein an outwardly extending annular shoulder is formed intermediate said rear and forward portions prior to the formation of said recess.

7. The method of producing a ball point writing tip having a writing ball rotatably seated at the forward end thereof comprising drawing flat metal stock into an elongated hollow shell having an open rear end and an outwardly flared annular portion at said open end, removing said flared portion to provide a shell of predetermined dimensions, then drawing said shell to reduce the diameter of the forward end thereof to a size smaller than that of the rear end, forming a hemispherical recess at the forward extremity of the forward end, said recess defining a seat for rotatably seating said writing ball, rotatably seating a writing ball in said recess, and forming an opening providing communication between the interior of the forward end and said recess for flowing writing fluid from said forward end to said ball.

8. A method of producing a ball point writing tip as recited in claim 7 wherein said flared portion is severed from said shell with a cutter moving parallel to the axis of said shell.

9. A method of producing a ball point writing tip as recited in claim 7 wherein said flared portion is removed from said shell in two stages, the first stage partially severing the interior wall of said shell and the second stage completing the severing, said severing being done in each stage with a cutter moving parallel to the axis of the shell.

10. A method of producing a ball point writing tip as recited in claim 7 wherein said opening is formed prior to reducing the diameter of the forward portion of said shell.

11. The method of producing a ball point writing tip having a writing ball rotatably seated in the forward end thereof comprising drawing flat metal stock into a hollow elongated writing tip shell having an open rear end, a closed forward end, and an outwardly flared annular portion at said open end, severing said flared portion to provide a shell of predetermined dimensions, squaring off the open edge of said shell, further drawing said shell to provide a tubular elongated blank having a generally cylindrical rear portion and a generally cylindrical forward portion of reduced diameter as compared with the diameter of the rear portion, forming an opening through said closed forward end for flowing writing fluid from the interior of the forward portion to the forward extremity thereof, forming a hemispherical recess at the forward extremity of the forward portion, said recess defining a seat for rotatably seating said writing ball, and rotatably seating said writing ball in said recess.

References Cited in the file of this patent

UNITED STATES PATENTS

| | | |
|---|---|---|
| 325,692 | Parker | Sept. 8, 1885 |
| 1,144,281 | Andrews | June 22, 1915 |
| 1,152,983 | Sherbondy | Sept. 7, 1915 |
| 1,225,915 | Zerk | May 15, 1917 |
| 1,665,203 | Delf | Apr. 10, 1928 |
| 1,697,035 | Wells | Jan. 1, 1929 |
| 2,398,698 | Crowley | Apr. 16, 1946 |
| 2,588,829 | Greist | Mar. 11, 1952 |
| 2,646,761 | Knobel | July 28, 1953 |
| 2,718,051 | Cloutier | Sept. 20, 1955 |
| 2,813,512 | Schrader | Nov. 19, 1957 |
| 2,879,586 | Fehling et al. | Mar. 31, 1959 |

FOREIGN PATENTS

| | | |
|---|---|---|
| 965,335 | France | Feb. 15, 1950 |
| 514,617 | Belgium | Oct. 31, 1952 |
| 1,032,475 | France | Mar. 25, 1953 |